United States Patent
Li

(10) Patent No.: US 12,328,542 B2
(45) Date of Patent: Jun. 10, 2025

(54) CHARGING DEVICE, METHOD FOR CORRECTING BATTERY LEVEL OF WIRELESS EARPHONES, AND COMPUTER READABLE STORAGE MEDIUM

(71) Applicant: GOERTEK INC., Shandong (CN)

(72) Inventor: Tao Li, Shandong (CN)

(73) Assignee: GOERTEK INC., Weifang (CN)

( * ) Notice: Subject to any disclaimer, the term of this patent is extended or adjusted under 35 U.S.C. 154(b) by 287 days.

(21) Appl. No.: 18/044,902

(22) PCT Filed: Oct. 29, 2020

(86) PCT No.: PCT/CN2020/124873
§ 371 (c)(1),
(2) Date: Mar. 10, 2023

(87) PCT Pub. No.: WO2022/052245
PCT Pub. Date: Mar. 17, 2022

(65) Prior Publication Data
US 2023/0308796 A1  Sep. 28, 2023

(30) Foreign Application Priority Data
Sep. 10, 2020  (CN) .......................... 202010944275.6

(51) Int. Cl.
*H04R 1/10*  (2006.01)
*H02J 7/00*  (2006.01)

(52) U.S. Cl.
CPC ........ *H04R 1/1025* (2013.01); *H02J 7/00032* (2020.01); *H02J 7/007* (2013.01); *H04R 1/1041* (2013.01); *H04R 2420/07* (2013.01)

(58) Field of Classification Search
CPC ................ H04R 1/1025; H04R 1/1041; H04R 2420/07; H02J 7/00032; H02J 7/007
See application file for complete search history.

(56) References Cited

U.S. PATENT DOCUMENTS

2017/0223180 A1  8/2017 Wang
2018/0077482 A1  3/2018 Yuan et al.
(Continued)

FOREIGN PATENT DOCUMENTS

CN  102590756 A  7/2012
CN  103048629 A  4/2013
(Continued)

OTHER PUBLICATIONS

International Search Report from International Application No. PCT/CN2020/124873 mailed May 28, 2021.

*Primary Examiner* — David L Ton
(74) *Attorney, Agent, or Firm* — Shih IP Law Group, PLLC

(57) ABSTRACT

Disclosed is a method for correcting battery level of wireless earphones. The wireless earphones comprise a voltameter, the voltameter determines the battery level of the wireless earphones according to a power supply voltage of the wireless earphones. The method for correcting battery level of wireless earphones comprises: when a charging device is started for the first time after firmware upgrade is completed, obtaining an interval period between a starting time point of the charging device and a predicted starting time point of the wireless earphones; determining a target period according to the interval period, wherein the target period is greater than or equal to the interval period; and controlling a charging circuit of the charging device to be disconnected for the target period, to enable the wireless earphones to be discharged for the target period.

10 Claims, 4 Drawing Sheets

(56) References Cited

U.S. PATENT DOCUMENTS

| | | | |
|---|---|---|---|
| 2019/0094305 A1 | 3/2019 | Takechi | |
| 2020/0241076 A1 | 7/2020 | Zeng et al. | |
| 2021/0263103 A1* | 8/2021 | Liao | G01R 31/382 |
| 2023/0092801 A1* | 3/2023 | Liu | G01R 31/3648 |
| | | | 320/108 |

FOREIGN PATENT DOCUMENTS

| | | | |
|---|---|---|---|
| CN | 105548887 A | 5/2016 | |
| CN | 109068211 A | 12/2018 | |
| CN | 109239611 A | 1/2019 | |
| CN | 109542477 A | 3/2019 | |
| CN | 109857437 A | 6/2019 | |
| CN | 110795127 A | 2/2020 | |
| CN | 110854945 A | 2/2020 | |
| CN | 111431975 A | 7/2020 | |
| IN | 110366063 A | 10/2019 | |

* cited by examiner

CHARGING DEVICE, METHOD FOR CORRECTING BATTERY LEVEL OF WIRELESS EARPHONES, AND COMPUTER READABLE STORAGE MEDIUM

This application claims the priority and benefits of Chinese Patent Application No. 202010944275.6, titled "CHARGING DEVICE, METHOD FOR CORRECTING BATTERY LEVEL OF WIRELESS EARPHONES, AND COMPUTER READABLE STORAGE MEDIUM", filed on Sep. 10, 2022, which is incorporated by reference as if fully set forth herein.

TECHNICAL FIELD

The present disclosure relates to the technical field of earphones, particularly, to a charging device, a method for correcting battery level of wireless earphones and a computer readable storage medium.

BACKGROUND ART

Earphones are classified as wireless earphones and wired earphones. A wireless earphone includes a power supply, and it requires an adaptive charging device to charge the wireless earphones. Therefore, when a firmware of the wireless earphones is upgraded, a firmware of the charging device also needs to be upgraded correspondingly.

Since the charging device and the wireless earphones need to be upgraded correspondingly, the charging device needs to be connected to an external power supply, and the wireless earphones need to be placed on the charging device so that the wireless earphones can send an upgrade package to the charging device, whereby the charging device and the wireless earphones can be upgraded correspondingly.

The battery level of the wireless earphones can be determined by a voltameter in a form of a software. After the synchronous upgrade of the charging device and the wireless earphones is completed, both need to transfer the code in the upgrade region to the operation region. However, the code transmission time of the wireless earphones is longer than the code transmission time of the charging device, so that the restart time of the charging device is earlier than the restart time of the wireless earphones, and the voltameter of the wireless earphones may be updated with the firmware upgrade of the wireless earphones, accordingly, the voltameter also needs to be restarted, whereby a voltage obtained by the voltameter after the restart of the wireless earphones is higher than an actual power supply voltage of the wireless earphones. As a result, the measured battery level after the firmware upgrade of the wireless earphones is much higher than the actual battery level, i.e., battery level measurement after the firmware upgrade of the wireless earphones has low accuracy.

SUMMARY

An object of the present disclosure is to provide a charging device, a method for correcting battery level of wireless earphones and a computer readable storage medium, to solve the problem of low accuracy of battery level measurement after the firmware upgrade of the wireless earphones.

In order to achieve the above object, the present disclosure provides a method for correcting battery level of wireless earphones. The wireless earphones include a voltameter, the voltameter determines the battery level of the wireless earphones according to a power supply voltage of the wireless earphones. The method for correcting battery level of wireless earphones includes:

In an embodiment, when a charging device is started for the first time after firmware upgrade is completed, obtaining an interval period between a starting time point of the charging device and a predicted starting time point of the wireless earphones;

In an embodiment, determining a target period according to the interval period. The target period is greater than or equal to the interval period; and In an embodiment, controlling a charging circuit of the charging device to be disconnected for the target period, to enable the wireless earphones to be discharged for the target period.

In an embodiment, the method further includes the following steps (before the step of obtaining an interval period between a starting time point of the charging device and a predicted starting time point of the wireless earphones).

In an embodiment, when the charging device is started, detecting whether an identification information is stored in the charging device. The charging device generates and stores identification information during firmware upgrade; and In an embodiment, if the identification information is stored in the charging device, determining that the charging device is started for the first time after firmware upgrade is completed, deleting the identification information, and performing the step of obtaining an interval period between a starting time point of the charging device and a predicted starting time point of the wireless earphones.

In an embodiment, the method further includes the following steps (before the step that when a charging device is started for the first time after firmware upgrade is completed, obtaining an interval period between a starting time point of the charging device and a predicted starting time point of the wireless earphones).

In an embodiment, receiving a firmware upgrade package transmitted by the wireless earphones;

In an embodiment, after receiving the firmware upgrade package is completed, sending a first message indicating the completion of receipt to the wireless earphones, and powering off the wireless earphones to perform firmware upgrade with the firmware upgrade package. Upon the wireless earphones receiving the first message, the wireless earphones are powered off to upgrade the firmware; and In an embodiment, starting the charging device after firmware upgrade of the charging device is completed.

In an embodiment, the method for correcting battery level of wireless earphones further includes:

In an embodiment, when the charging device is started for the first time after firmware upgrade is completed, determining whether the current firmware upgrade of the wireless earphones includes an update of the voltameter with the firmware upgrade package; and In an embodiment, if it is determined that the current firmware upgrade of the wireless earphones includes an update of the voltameter, performing the step of obtaining an interval period between a starting time point of the charging device and a predicted starting time point of the wireless earphones.

In an embodiment, the method further includes the following steps (after the step of determining whether the current firmware upgrade of the wireless earphones includes an update of the voltameter with the firmware upgrade package).

In an embodiment, if it is determined that the current firmware upgrade of the wireless earphones does not include an update of the voltameter, and the wireless earphones are restarted, sending a second message indicating that the voltameter is not to be updated to the wireless earphones, to enable the wireless earphones to determine a battery level value of the wireless earphones after restart by using a stored battery level value according to the second message, and when the earphones are powered off to perform firmware upgrade, obtaining and storing a current battery level value.

In an embodiment, during a disconnection time of the charging circuit, upon receiving start information sent from the wireless earphones, connecting with the charging circuit.

In an embodiment, a difference value between the target period and the interval period is less than a preset difference value.

In an embodiment, the interval period is determined according to version information, the version information is version information of the firmware upgrade package corresponding to the firmware upgrade of the charging device.

In order to achieve the above object, the present disclosure also provides a charging device, the charging device includes a memory, a processor and a battery level correction program stored in the memory and executable on the processor. The battery level correction program is configured to be executed by the processor to perform the steps of the method for correcting battery level of wireless earphones as described above.

In order to achieve the above object, the present disclosure also provides a computer readable storage medium, the computer readable storage medium stores a battery level correction program, and the battery level correction program is configured to be executed by the processor to perform the steps of the method for correcting battery level of wireless earphones as described above.

According to the charging device, the method for correcting battery level of wireless earphones and the computer readable storage medium of the present disclosure, when a charging device is started for the first time after firmware upgrade is completed, an interval period between a starting time point of the charging device and a predicted starting time point of the wireless earphones is obtained, and a target period is determined according to the interval period, the target period is less than the interval period, so that a charging circuit of the charging device is controlled to be disconnected for the target period, to enable the wireless earphones to be discharged for the target period. Since the charging circuit of the charging device is disconnected during the code transmission process of the wireless earphones, the wireless earphones are discharged, so that the voltage obtained by the voltameter after the wireless earphones are started is the actual voltage of the power supply after the discharging of the wireless earphones, rather than the charging voltage of the charging device, and thus accurately measures the battery level of the wireless earphones. Therefore, a high accuracy battery level measurement after the firmware upgrade of the wireless earphones is achieved.

BRIEF DESCRIPTION OF THE DRAWINGS

In order to explain the technical solutions of the embodiments of the present disclosure or in the prior art more clearly, the following will briefly illustrate the accompanying drawings required for the description of the embodiments or the prior art. It should be understand that the drawings in the following description are only part of the drawings of the present disclosure, and for those skilled in the art, other drawings can also be obtained according to the provided drawings without any creative effort.

DETAILED DESCRIPTION OF THE EMBODIMENTS

The technical solutions of the embodiments of the present disclosure will be described below with reference to the drawings. Obviously, the described embodiments are only part of the embodiments of the present disclosure, rather than all the embodiments. Based on the embodiments according to the present disclosure, all other embodiments obtained by persons of ordinary skill in the art without creative efforts shall fall within the protection scope of the present disclosure.

The technical solution of the embodiment of the present disclosure includes: when a charging device is started for the first time after firmware upgrade is completed, obtaining an interval period between a starting time point of the charging device and a predicted starting time point of the wireless earphones; determining a target period according to the interval period. The target period is greater than or equal to the interval period; and controlling a charging circuit of the charging device to be disconnected for the target period, to enable the wireless earphones to be discharged for the target period.

Since the charging circuit of the charging device is disconnected during the code transmission process of the wireless earphones, the wireless earphones are discharged, so that the voltage obtained by the voltameter after the wireless earphones are started is the actual voltage of the power supply after the discharging of the wireless earphones, rather than the charging voltage of the charging device, and thus accurately measures the battery level of the wireless earphones. Therefore, a high accuracy battery level measurement after the firmware upgrade of the wireless earphones is achieved.

Figure 1:
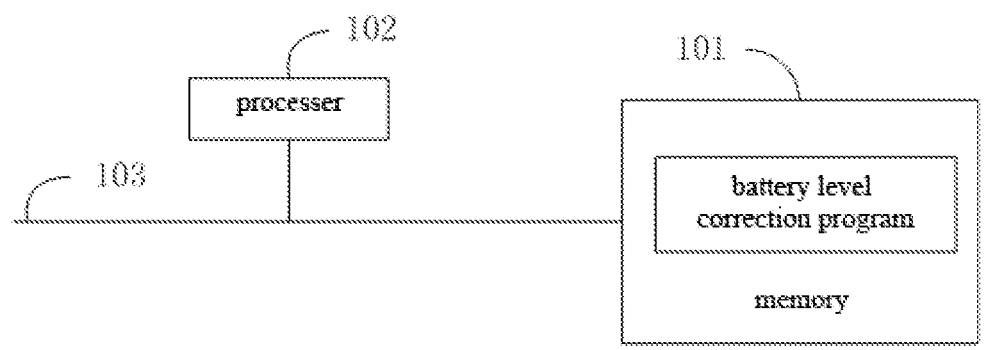
FIG. 1 is a structural schematic diagram of the hardware of a charging device according to an embodiment of the present disclosure.

According to an embodiment, the charging device may be provided as shown in FIG. 1.

The embodiment of the present disclosure provides a charging device, which includes a memory 101, a processor 102 (e.g., a CPU), and a communication bus 103. The communication bus 103 is used to realize connection communication between these components.

The memory may be a high-speed RAM storage device or a non-volatile memory (e.g., a disk storage device). As shown in FIG. 1, the memory 101 may include an image processing program therein, the processor 102 may function to perform a battery level correction program stored in the memory 101 to perform the following operations.

When a charging device is started for the first time after firmware upgrade is completed, obtaining an interval period between a starting time point of the charging device and a predicted starting time point of the wireless earphones.

Determining a target period according to the interval period. The target period is greater than or equal to the interval period.

Controlling a charging circuit of the charging device to be disconnected for the target period, to enable the wireless earphones to be discharged for the target period.

In an embodiment, the processor 102 may function to perform the battery level correction program stored in the memory 101 to perform the following operations.

When the charging device is started, detecting whether an identification information is stored in the charging device. The charging device generates and stores identification information during firmware upgrade.

If the identification information is stored in the charging device, determining that the charging device is started for the first time after firmware upgrade is completed, deleting the identification information, and performing the step of obtaining an interval period between a starting time point of the charging device and a predicted starting time point of the wireless earphones.

In an embodiment, the processor 102 may function to perform the battery level correction program stored in the memory 101 to perform the following operations.

Receiving a firmware upgrade package transmitted by the wireless earphones.

After receiving the firmware upgrade package is completed, sending a first message indicating the completion of receipt to the wireless earphones, and powering off the wireless earphones to perform firmware upgrade with the firmware upgrade package. Upon the wireless earphones receiving the first message, the wireless earphones are powered off to upgrade the firmware; and starting the charging device after firmware upgrade of the charging device is completed.

In an embodiment, the processor 102 may function to perform the battery level correction program stored in the memory 101 to perform the following operations.

When the charging device is started for the first time after firmware upgrade is completed, determining whether the current firmware upgrade of the wireless earphones includes an update of the voltameter with the firmware upgrade package.

If it is determined that the current firmware upgrade of the wireless earphones includes an update of the voltameter, performing the step of obtaining an interval period between a starting time point of the charging device and a predicted starting time point of the wireless earphones.

In an embodiment, the processor 102 may function to perform the battery level correction program stored in the memory 101 to perform the following operations.

If it is determined that the current firmware upgrade of the wireless earphones does not include an update of the voltameter, and the wireless earphones are restarted, sending a second message indicating that the voltameter is not to be updated to the wireless earphones, to enable the wireless earphones to determine a battery level value of the wireless earphones after restart by using a stored battery level value according to the second message, and when the earphones are powered off to perform firmware upgrade, obtaining and storing a current battery level value.

In an embodiment, the processor 102 may function to perform the battery level correction program stored in the memory 101 to perform the following operations.

During the disconnection time of the charging circuit, upon receiving start information sent from the wireless earphones, connecting with the charging circuit.

In an embodiment, the processor 102 may function to perform the battery level correction program stored in the memory 101 to perform the following operations.

A difference value between the target period and the interval period is less than a preset difference value.

In an embodiment, the processor 102 may function to perform the battery level correction program stored in the memory 101 to perform the following operations.

The interval period is determined according to version information. The version information is version information of the firmware upgrade package corresponding to the firmware upgrade of the charging device.

According to the above technical solution, when a charging device is started for the first time after firmware upgrade is completed, an interval period between a starting time point of the charging device and a predicted starting time point of the wireless earphones is obtained, and a target period is determined according to the interval period, the target period is less than the interval period, so that a charging circuit of the charging device is controlled to be disconnected for the target period, to enable the wireless earphones to be discharged for the target period. Since the charging circuit of the charging device is disconnected during the code transmission process of the wireless earphones, the wireless earphones are discharged, so that the voltage obtained by the voltameter after the wireless earphones are started is the actual voltage of the power supply (e.g., an internal battery) after the discharging of the wireless earphones, rather than the charging voltage of the charging device, and thus accurately measures the battery level of the wireless earphones. Therefore, a high accuracy battery level measurement after the firmware upgrade of the wireless earphones is achieved.

Based on the hardware architecture of the image processing device, the present disclosure proposes an alternative embodiment of the method for correcting battery level of wireless earphones.

Figure 2:
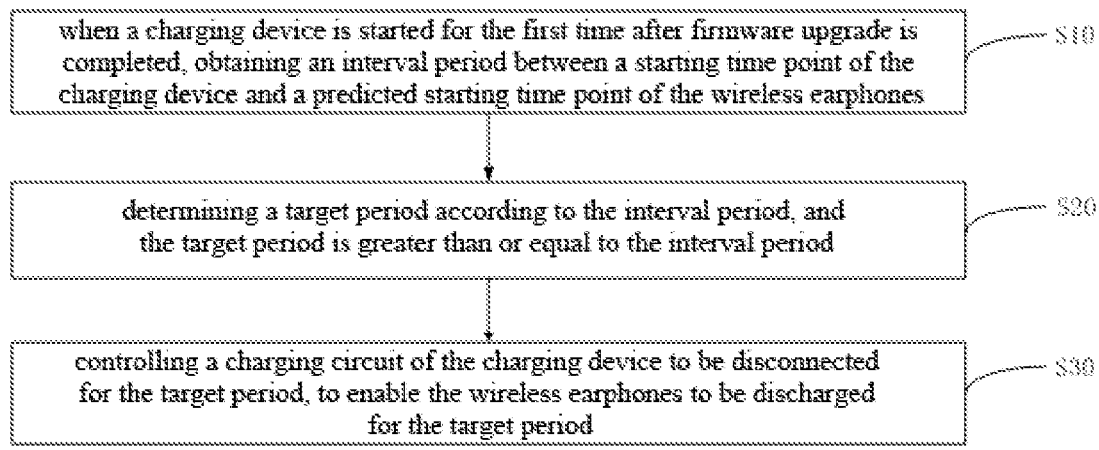
FIG. 2 is a flow diagram of a method for correcting battery level of wireless earphones according to a first embodiment of the present disclosure.

Referring to FIG. 2, FIG. 2 is the method for correcting battery level of wireless earphones according to a first embodiment of the present disclosure, the method for correcting battery level of wireless earphones includes the following steps At step S10, when a charging device is started for the first time after firmware upgrade is completed, obtaining an interval period between a starting time point of the charging device and a predicted starting time point of the wireless earphones.

In the present embodiment, the executive body is the charging device. The charging device is a supporting charging device of the wireless earphones. The wireless earphones may be TWS (True Wireless Stereo) earphones. The wireless earphones are provided with a voltameter, the battery level of the wireless earphones is determined according to the detected voltage, and the voltameter is disposed of the wireless earphones in the form of software. That is, the voltameter may be upgraded together with the firmware upgrade of the wireless earphones.

The charging device includes two storage regions A and B. The charging device is operated with the firmware in the region A during operation. The firmware received by the charging device is stored in the region B. After the charging device completes the firmware upgrade, the firmware code in the region B needs to be moved to the region A to continue loading the upgraded firmware, so that the charging device can be operated with the updated firmware after the charging device is started. Likewise, the wireless earphones also include two storage regions A and B, and when the wireless earphones are in operation, the firmware is operated with the region A, the firmware received by the wireless earphones is stored in the region B. After the firmware upgrade of the wireless earphones is completed, the firmware code in the region B needs to be moved to the region A.

When the firmware of the wireless earphones is upgraded, the wireless earphones are placed on the charging device, and the charging device is connected to an external power supply. After the wireless earphones are in communication connection with a mobile phone, the mobile phone can send a firmware upgrade package to the wireless earphones, and after receiving the firmware upgrade package is completed, the wireless earphones may continue to check whether a firmware upgrade package of the charging device is included in the firmware upgrade package. When it is included therein, the firmware upgrade package of the charging device may be sent to the charging device. After receiving the firmware upgrade package is completed, the charging device can be powered off to upgrade the firmware.

The charging device can be started automatically after the firmware upgrade, which can be regarded as the first time that the charging device is started after the firmware upgrade. The time point of firmware upgrade of the charging device and the time point of the wireless earphones are almost the same. That is, there is little difference value between the time points of firmware upgrade. When the charging device is started for the first time after firmware upgrade is completed, obtaining an interval period between a predicted starting time point of the wireless earphones and a starting time point of the charging device. The interval period may be determined by version information of the firmware upgrade package of the charging device, the version information may include an update amount of data of the wireless earphones, and the charging device can determine a first period during which the wireless earphones transfer the code according to the update amount and the data volume transferred by the wireless earphones in a unit time. The version information also includes an update amount of data of the charging device, so that a second period during which the charging device transfers the code may be determined according to the update amount of data of the charging device and the data volume transferred by the charging device in a unit time. The interval period may be obtained by subtracting the second period from the first period. For example, the firmware of the charging device and the wireless earphones is upgraded from V1.1 to V1.2, the first period is 15 s, the second period is 2 s, and the interval period is 13 s.

At step S20, determining a target period according to the interval period. The target period is greater than or equal to the interval period.

After determining the interval period, the charging device can determine the target period according to the interval period. The target period is greater than or equal to the interval period. For example, the interval period is 13 s, the target period is greater than or equal to 13 s.

The wireless earphones consume a lot of battery level during the firmware upgrade, so it needs to be charged in time, i.e., a difference value between the target period and the interval period should not be too large. Therefore, the difference value between the target period and the interval period is set to be less than a preset difference value to ensure that the wireless earphones can be charged timely.

At step S30, controlling a charging circuit of the charging device to be disconnected for the target period, to enable the wireless earphones to be discharged for the target period.

The charging device is provided with a charging circuit, which is used to connect the external power supply and the wireless earphones, so that the external power supply can charge the wireless earphones. After determining the target period, the charging device can control the charging circuit to be disconnected for the target period, so that the wireless earphones may be discharged when transferring the code. The charging device can control the charging circuit to be disconnected from the external power supply, or control the charging circuit to be disconnected from the wireless earphones.

It should be noted that a first data volume stored in the charging device for the wireless earphones transferring the code is obtained by testing in a preset working condition, and thus a second data volume for the wireless earphones transferring the code may be different from the stored data volume. When the second data amount is greater than the first data amount, the wireless earphones may be started in advance, i.e., during the disconnection time of the charging circuit, the wireless earphones may send start information to the charging device to notify the charging device to connect with the charging circuit, so that the wireless earphones may be charged. When the first data volume is greater than the second data volume, the wireless earphones may be started later. At this time, the charging device continues to disconnect the charging circuit and then connects with the charging circuit upon receiving the start information sent from the wireless earphones.

During the charging process of the wireless earphones, when the battery level of the wireless earphones is less than a threshold value, the current is constant. When the battery level of the wireless earphones is greater than or equal to the threshold value, the current decreases and the voltage tends to be stable. The threshold value may be any suitable value. For example, the threshold value may be 99%. In the prior art, during the code transmission process of the wireless earphones, the charging device is connected to the external power supply, the earphones are not started, so the earphones may be regarded as a resistance. When the earphones are started, the voltameter detects a charging voltage converted by the external power supply, so the battery level of the earphones may be suddenly changed to 99%, but the actual battery level of the earphones may be 50%. In the present embodiment, during the code transmission process of the wireless earphones, the charging circuit of the charging device is disconnected so that the wireless earphones are in a discharge state. When the code transmission process of the wireless earphones is completed and the wireless earphones are started, the voltameter detects a discharging voltage of the power supply, which is the actual voltage of the power supply, and thus, the battery level after the firmware upgrade of the wireless earphones is accurately measured.

In the technical solution provided by the present embodiment, when a charging device is started for the first time after firmware upgrade is completed, an interval period between a starting time point of the charging device and a predicted starting time point of the wireless earphones is obtained, and a target period is determined according to the interval period, the target period is less than the interval period, so that a charging circuit of the charging device is controlled to be disconnected for the target period, to enable the wireless earphones to be discharged for the target period. Since the charging circuit of the charging device is disconnected during the code transmission process of the wireless earphones, the wireless earphones are discharged, so that the voltage obtained by the voltameter after the wireless earphones are started is the actual voltage of the power supply after the discharging of the wireless earphones, rather than the charging voltage of the charging device, and thus accurately measures the battery level of the wireless earphones. Therefore, a high accuracy battery level measurement after the firmware upgrade of the wireless earphones is achieved.

Figure 3:
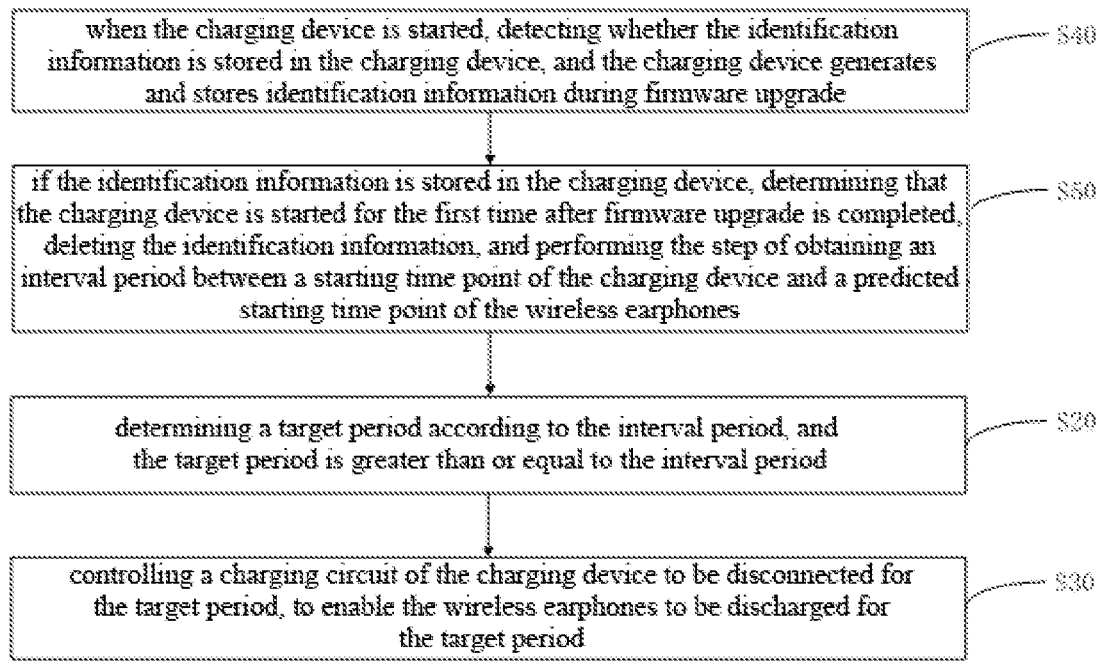
FIG. 3 is a flow diagram of the method for correcting battery level of wireless earphones according to a second embodiment of the present disclosure.

Referring to FIG. 3, FIG. 3 is the method for correcting battery level of wireless earphones according to a second embodiment of the present disclosure. Based on the first embodiment, the method further includes the following steps (before the step S10).

At step S40, when the charging device is started, detecting whether the identification information is stored in the charging device. The charging device generates and stores identification information during firmware upgrade.

At step S50, if the identification information is stored in the charging device, determining that the charging device is started for the first time after firmware upgrade is completed, deleting the identification information, and performing the step of obtaining an interval period between a starting time point of the charging device and a predicted starting time point of the wireless earphones.

In the present embodiment, the charging device generates and stores identification information during firmware upgrade. The identification information may indicate the firmware upgrade of the charging device. The identification information may be that the charging device has completed the firmware upgrade.

When the charging device is started, the charging device detects whether the identification information is stored. If the identification information is stored, it can be determined that the charging device is started for the first time after the firmware upgrade is completed. At this time, the battery level of the wireless earphones needs to be corrected, i.e., the charging circuit needs to be disconnected. That is, the charging device deletes the identification information, and performs steps S10 to S30. If the identification information is not stored in the charging device, it can be determined that the charging device charges the wireless earphones normally, not after the firmware upgrade, and the charging circuit of the charging device does not need to be disconnected.

In the technical solution provided by the present embodiment, when the charging device is started, it detects whether the identification information is stored. If the identification information is stored, the charging device deletes the identification information and disconnects the charging circuit to correct the battery level of the wireless earphones. If the identification information is not stored, the charging device connects with the charging circuit to charge the wireless earphones to avoid unnecessary battery level correction of the wireless earphones.

Figure 4:
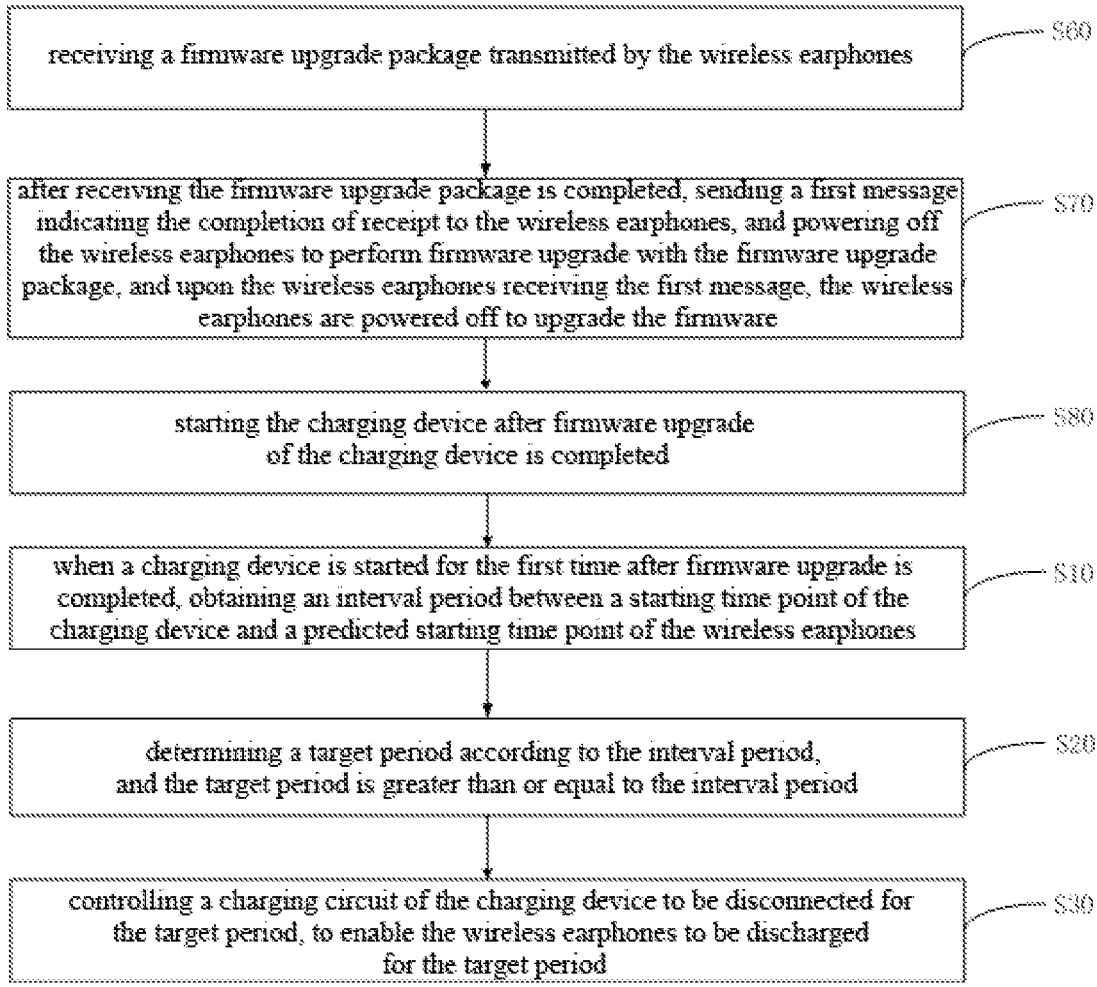
FIG. 4 is a flow diagram of the method for correcting battery level of wireless earphones according to a third embodiment of the present disclosure.

Referring to FIG. 4, FIG. 4 is the method for correcting battery level of wireless earphones according to a third embodiment of the present disclosure. Based on the first or second embodiment, the method further includes the following steps (before the step S10).

At step S60, receiving a firmware upgrade package transmitted by the wireless earphones.

At step S70, after receiving the firmware upgrade package is completed, sending a first message indicating the completion of receipt to the wireless earphones, and powering off the wireless earphones to perform firmware upgrade with the firmware upgrade package. Upon the wireless earphones receiving the first message, the wireless earphones are powered off to upgrade the firmware.

At step S80, starting the charging device after firmware upgrade of the charging device is completed.

In the present embodiment, when receiving the firmware upgrade package sent by the mobile phone, the wireless earphones may first cache the firmware upgrade package. After caching the firmware upgrade package, the wireless earphones parse the firmware upgrade package to obtain a first firmware upgrade package and a second firmware upgrade package. The first firmware upgrade package is the upgrade package of the wireless earphones, and the second firmware upgrade package is the upgrade package of the charging device. The wireless earphones may send the second firmware upgrade package to the charging device. That is, the charging device receives the firmware upgrade package transmitted by the wireless earphones.

After the charging device finishes caching the firmware upgrade package, i.e., after receiving the firmware upgrade package is completed, it sends a first message to the wireless earphones, and the charging device is powered off automatically to upgrade the firmware according to the received firmware upgrade package. After receiving the first message, the wireless earphones are also powered off to upgrade the firmware. After the firmware upgrade is completed, the charging device is started.

In the technical solution provided by the present embodiment, the charging device is started immediately after firmware upgrade of the charging device is completed, to charge the wireless earphones timely.

Figure 5:
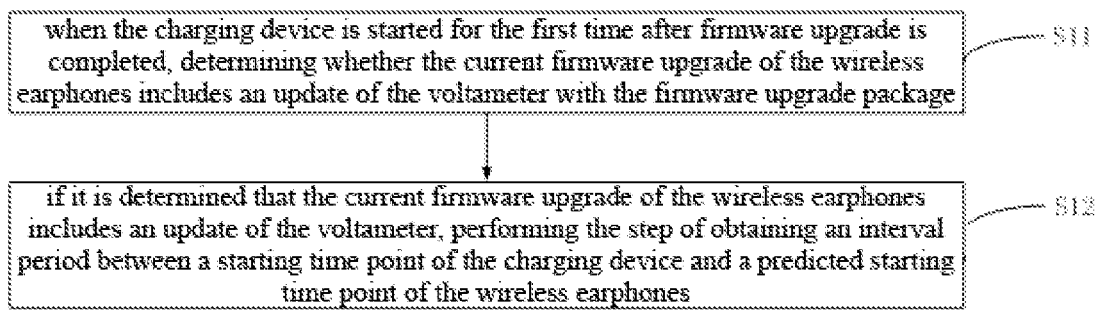
FIG. 5 is a detailed flow diagram of step S10 of the method for correcting battery level of wireless earphones according to a fourth embodiment of the present disclosure.

Referring to FIG. 5, FIG. 5 is the method for correcting battery level of wireless earphones according to a fourth embodiment of the present disclosure. Based on the third embodiment, the step S10 includes the following steps.

Step S11, when the charging device is started for the first time after firmware upgrade is completed, determining whether the current firmware upgrade of the wireless earphones includes an update of the voltameter with the firmware upgrade package.

Step S12, if it is determined that the current firmware upgrade of the wireless earphones includes an update of the voltameter, performing the step of obtaining an interval period between a starting time point of the charging device and a predicted starting time point of the wireless earphones.

In the present embodiment, when the firmware of the wireless earphones is upgraded, the voltameter may not necessarily be upgraded. If the voltameter is not upgraded, the voltameter may not be initialized. At this time, the battery level of the wireless earphones may not change suddenly. When the voltameter is upgraded, the voltameter may be initialized, and the voltameter needs to determine the battery level of the wireless earphones according to the voltage detected when the wireless earphones are started.

The second firmware upgrade package received by the charging device matches the first firmware upgrade package, so that the second firmware upgrade package may include the upgrade content of the first firmware upgrade package. When the charging device is started for the first time after the upgrade with the second firmware upgrade package is completed, the charging device may determine whether the current firmware upgrade of the wireless earphones includes an update of the voltameter according to the upgrade content of the wireless earphones in the second firmware upgrade package. If it is determined that the current firmware upgrade of the wireless earphones includes an update of the voltameter, the battery level of the wireless earphones needs to be corrected, accordingly, step S10 to step S30 are performed.

If it is determined that the current firmware upgrade of the wireless earphones does not include an update of the voltameter, and when the wireless earphones are restarted. That is, upon receiving start information sent from the wireless earphones, a second message indicating that the voltameter is not to be updated is sent to the wireless earphones. When the wireless earphones are powered off to perform firmware upgrade, they obtain and store the current battery level value. Upon the wireless earphones receiving the second message, the stored battery level value is used to determine the battery level value when the wireless earphones are restarted.

In the technical solution provided by the present embodiment, when the charging device is started for the first time after firmware upgrade is completed, it determines whether the wireless earphones update the voltameter with the firmware upgrade package, and when the voltameter is updated, the current of the wireless earphones is corrected to avoid inaccurate measurement of the battery level of the wireless earphones.

The present disclosure also provides a charging device, the charging device includes a memory, a processor and a battery level correction program stored in the memory and executable on the processor. When the battery level correction program is executed by the processor, the steps of the method for correcting battery level of wireless earphones as described above are realized.

The present disclosure also provides a computer readable storage medium, the computer readable storage medium stores a battery level correction program, and when the battery level correction program is executed by the processor, the steps of the method for correcting battery level of wireless earphones as described above are realized.

In the specification, each embodiment is described in a parallel or a progressive manner. Each embodiment focuses on the differences with other embodiments. The same or similar parts of each embodiment can be referred to each other. For the device disclosed in the embodiment, since it corresponds to the method disclosed in the embodiment, the description thereof is relatively simple, and the relevant contents can be referred to the description of the method.

Those skilled in the art will also understand that the units and algorithm steps of each example described in combination with the embodiments disclosed herein can be implemented in electronic hardware, computer software, or a combination of the two. In order to clearly explain the interchangeability of hardware and software, the composition and steps of each example have been generally described in the above description according to their functions. Whether these functions are implemented in hardware or software depends on the specific disclosure and design constraints of the technical solution. Those skilled in the art can use different methods for each specific disclosure to realize the described functions, but such implementation should not be considered beyond the scope of the present disclosure.

The steps of the method or algorithm described in connection with the embodiments disclosed herein can be directly implemented with hardware, software modules executed by a processor, or a combination of the two. The software module may be provided in random access memory (RAM), memory, read-only memory (ROM), electrically programmable ROM, electrically erasable programmable ROM, register, hard disk, removable disk, CD-ROM, or any other form of storage medium known in the technical field.

It should also be noted that relational terms such as first, second, and the like are only used to distinguish one entity or operation from another entity or operation herein, and do not necessarily require or imply any such actual relationship or order between these entities or operations. Moreover, the terms "including", "comprising", or any other variant thereof are intended to cover non exclusive inclusion, so that a process, method, article, or device including a series of elements not only includes those elements, but also includes other elements not explicitly listed, or also includes elements inherent to such process, method, article or device. Without further restrictions, the element defined by the statement "include a . . . " do not exclude the presence of another identical elements in the process, method, article, or device including the element.

What is claimed is:

1. A method for correcting battery level of wireless earphones, wherein the wireless earphones comprise a voltameter, the voltameter determines the battery level of the wireless earphones according to a power supply voltage of the wireless earphones, the method for correcting battery level of wireless earphones comprises the following steps:
   when a charging device is started for the first time after firmware upgrade is completed, obtaining an interval period between a starting time point of the charging device and a predicted starting time point of the wireless earphones;
   determining a target period according to the interval period, wherein the target period is greater than or equal to the interval period; and
   controlling a charging circuit of the charging device to be disconnected for the target period, to enable the wireless earphones to be discharged for the target period.

2. The method for correcting battery level of wireless earphones according to claim 1, further comprising, before the step of obtaining an interval period between a starting time point of the charging device and a predicted starting time point of the wireless earphones:
   when the charging device is started, detecting whether an identification information is stored in the charging device, wherein the charging device generates and stores the identification information during the firmware upgrade; and
   if the identification information is stored in the charging device, determining that the charging device is started for the first time after the firmware upgrade is completed, deleting the identification information, and performing the step of obtaining an interval period between a starting time point of the charging device and a predicted starting time point of the wireless earphones.

3. The method for correcting battery level of wireless earphones according to claim 1, further comprising, before the step that when a charging device is started for the first time after firmware upgrade is completed:
   obtaining an interval period between a starting time point of the charging device and a predicted starting time point of the wireless earphones;
   receiving a firmware upgrade package transmitted by the wireless earphones;
   after receiving the firmware upgrade package is completed, sending a first message indicating the completion of receipt to the wireless earphones, and powering off the wireless earphones to perform firmware upgrade with the firmware upgrade package, wherein upon the wireless earphones receiving the first message, the wireless earphones are powered off to upgrade the firmware; and
   starting the charging device after the firmware upgrade of the charging device is completed.

4. The method for correcting battery level of wireless earphones according to claim 3, further comprising:
  when the charging device is started for the first time after firmware upgrade is completed, determining whether the current firmware upgrade of the wireless earphones comprises an update of the voltameter with the firmware upgrade package; and
  if it is determined that the current firmware upgrade of the wireless earphones comprises the update of the voltameter, performing the step of obtaining an interval period between a starting time point of the charging device and a predicted starting time point of the wireless earphones.

5. The method for correcting battery level of wireless earphones according to claim 4, further comprising, after the step of determining whether the current firmware upgrade of the wireless earphones comprises an update of the voltameter with the firmware upgrade package:
  if it is determined that the current firmware upgrade of the wireless earphones does not comprise the update of the voltameter, and the wireless earphones are restarted, sending a second message indicating that the voltameter is not to be updated to the wireless earphones, to enable the wireless earphones to determine a battery level value of the wireless earphones after restart by using a stored battery level value according to the second message, and when the earphones are powered off to perform firmware upgrade, obtaining and storing a current battery level value.

6. The method for correcting battery level of wireless earphones according to claim 1, wherein during a disconnection time of the charging circuit, upon receiving start information sent from the wireless earphones, connecting with the charging circuit.

7. The method for correcting battery level of wireless earphones according to claim 1, wherein a difference value between the target period and the interval period is less than a preset difference value.

8. The method for correcting battery level of wireless earphones according to claim 1, wherein the interval period is determined according to version information, the version information is version information of the firmware upgrade package corresponding to the firmware upgrade of the charging device.

9. A charging device, the charging device comprising a memory, a processor and a battery level correction program stored in the memory and executable on the processor, wherein the battery level correction program is configured to be executed by the processor to perform the steps of the method for correcting battery level of wireless earphones according to claim 1.

10. A computer readable storage medium, wherein the computer readable storage medium stores a battery level correction program, and the battery level correction program is configured to be executed by the processor to perform the steps of the method for correcting battery level of wireless earphones according to claim 1.

* * * * *